No. 715,305. Patented Dec. 9, 1902.
E. H. SEDDON.
PNEUMATIC TIRE.
(Application filed Apr. 15, 1901.)
(No Model.)
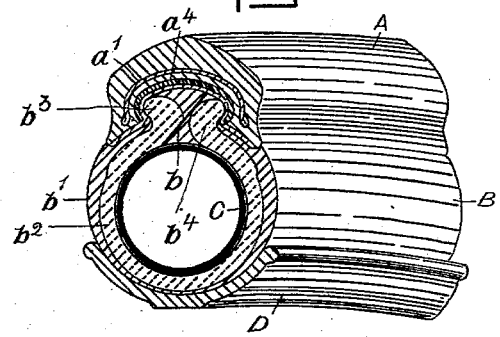
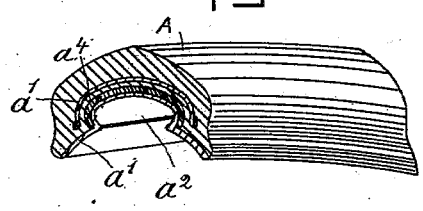 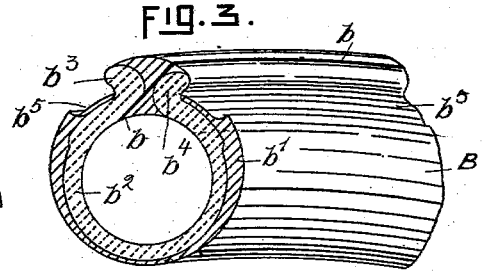
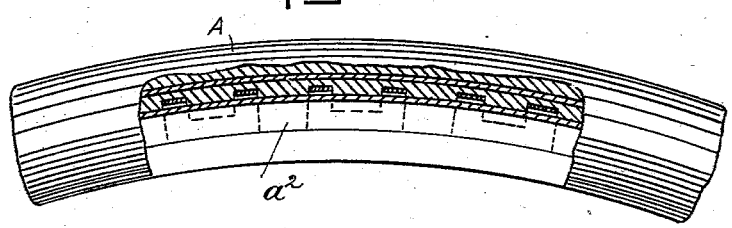
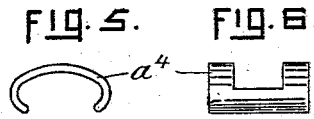 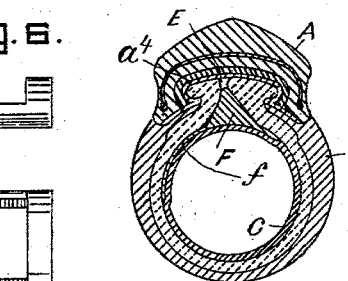 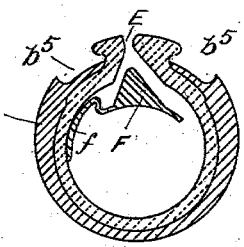
WITNESSES.
W. J. Barker
Anna P. McCole.
INVENTOR,
E. H. SEDDON.
By Edward P. Thompson
atty
THE NORRIS PETERS CO., PHOTO-LITHO., WASHINGTON, D. C.

UNITED STATES PATENT OFFICE.

EDWARD HENRY SEDDON, OF BROOKLANDS, ENGLAND.

PNEUMATIC TIRE.

SPECIFICATION forming part of Letters Patent No. 715,305, dated December 9, 1902.

Application filed April 15, 1901. Serial No. 55,929. (No model.)

*To all whom it may concern:*

Be it known that I, EDWARD HENRY SEDDON, a subject of the King of Great Britain, residing at Woodbourne, Brooklands, in the county of Chester, England, have invented certain new and useful Improvements in Pneumatic Tires, of which the following is a specification.

My invention relates to pneumatic tires for velocipedes and other road-vehicles—for instance, motor and horse-drawn vehicles—and especially to such tires in which the cover or jacket of the air-tube is adapted to open along its outer periphery and to be secured at the joint and protected by a separate annular part forming the tread.

The object of this invention is to make tires constructed on this principle practicable to use and to repair quickly and easily when punctured.

In my improved tire the cover is made with a longitudinal opening or joint along the outer periphery, with a continuous bend or annular hook-shaped projection formed of india-rubber and canvas on each edge of the cover, the two edges forming an annular dovetail. The cover is preferably made thinner in the part resting in the rim and thicker toward the edges and may be fixed to the rim by a wire inside, with arrangements for tightening the same, or by bolts passing through the cover and rim secured by nuts. The edges of the cover are held together by means of a separate tread made of india-rubber strengthened with canvas, in which tread are embedded metal clips having contracted jaws or a dovetail cross-section at regular distances apart, but not not touching or overlapping one another, the dovetail of the tread when the latter is in position receiving the two annular hooked edges of the cover. The tread can be applied when the tire is deflated. The hooked edges of the cover may be formed with their internal edges chamfered, so that when in position an annular internal groove is formed, and into this groove a wedge-shaped molded ridge made in parts and supported by the air-tube is forced by the pressure of the air. This ridge may be carried by a loose flap secured to one side of the cover.

In tires having a separate annular tread dovetailed to the cover and metal clips embedded in the tread for the purpose of strengthening the walls of the dovetail groove therein hitherto proposed the clips have been arranged so as to butt together or to overlap one another. This is a defective arrangement, as it reduces the flexibility of the tread and causes friction to be set up between the clips at their ends, the movement of the clips tending to loosen their hold in the body of the tread, and thereby facilitate their working through the same and destroying the tread. By my construction or arrangement of the tread the metal clips being dissociated from one another do not interfere with the flexibility of the tread and under working conditions freely float with the tread and under no conditions come in contact with one another, the tread being for all practical purposes as freely flexible as without them, both in the plane of the tire and laterally with respect thereto.

In the drawings, Figure 1 represents a segment of the improved tire in cross-section. Fig. 2 represents a segment of the tread, and Fig. 3 a segment of the cover, both in cross-section. Fig. 4 represents a segment of the tread partly in longitudinal section. Figs. 5, 6, and 7 represent several views of the "dovetail" clips I at present use. Figs. 8 and 9 represent a cross-section of a tire having a wedge-shaped ridge between the edges of the cover.

Referring to Figs. 1 to 4 of the drawings, A represents the tread; B, the cover; C, the air-tube, and D the rim or felly. The rim may be of any suitable cross-section, and the tire may be secured thereto in any suitable known way. For instance, a metal wire or band may be passed around the bottom of the cover, binding it to the rim, or bolts having flat thin heads may be passed through the cover and rim and be secured, by means of nuts, upon the outside of the rim, both in the well-known way. The means for securing the tire to the rim are not shown on the drawings. The air-tube C is fitted with the usual non-return inflating-valve in the ordinary way, which is also not shown on the drawings. The cover or jacket B of the tire is formed with a longitudinal peripheral joint at *b*, preferably beveled, as shown, in order to facilitate the releasing thereof. The cover is built up of india-rubber $b'$ and canvas $b^2$ in the usual way, the drawings representing a heavily-built tire suitable for motor-carriages and horse-drawn vehicles, the canvas backing being specially thick. The joint $b$ divides a dovetail annular ridge made in two parts $b^3$ $b^4$, which bend over externally. I form an annular sinking or channel $b^5$ on each side of the dovetail in the cover, as shown in Figs. 1 and 3, for the purpose of seating the tread securely upon the cover and preventing foreign substances from easily working in between the tread and the cover.

The tread A consists of an annular ring, preferably of the cross-sectional form shown in the several views. It is made of india-rubber $a$, with strengthening insertions $a'$ of canvas. It is molded with a groove $a^2$ to fit the dovetail formed by the two edges or parts $b^3$ $b^4$ and to sit upon the cover in the channels $b^5$. In order to prevent the dovetail groove $a^2$ from widening at its entrance or mouth under the stresses of air-pressure and usage, I insert at intervals apart metal clips $a^4$, preferably of the form shown in Figs. 5 to 7. These clips are protected by canvas $a'$ and are vulcanized in the tread during its manufacture. The clips are spaced apart as far as possible consistent with the thickness of the side of the tread and their object of offering the necessary resistance to lateral expansion.

The tread may be made in segments, having the segments joined together by metal connections. For instance, a short metal plate secured to the canvas in one segment may be secured in the next segment by means of a bolt and nut sunk in the surfaces of the tread, so that any particular segment may be replaced by another like one when damaged.

Referring to Figs. 8 and 9, for heavily-constructed tires an annular space or cavity E is formed in the crown of the cover between the two edges $b^3$ $b^4$, and a wedge-shaped annular ring or ridge F, which may be formed and used in segments adapted to enter between the edges $b^3$ $b^4$, is secured to an annular flap $f$, which may also be cut into segments, the flap being secured along one edge to the interior wall of the cover.

I claim as my invention—

1. In a pneumatic tire the combination of a tubular cover divided on its outer periphery and formed with lateral dovetail projections at the edges, a detachable tread part adapted to fit over said dovetail edges and having metal dovetail clips embedded in the india-rubber of said tread part and faced with canvas and arranged transversely at a short distance apart from each other.

2. The combination of a pneumatic-tire cover divided on its outer periphery, dovetail projections formed laterally on the edges of said cover, an annular tread of india-rubber and canvas adapted to fit over said edges with a dovetailed groove and metal clips consisting of open frames bent over at the sides embedded in the india-rubber of said tread at regular intervals.

3. The combination of a pneumatic-tire cover divided on its outer periphery and having dovetail lateral projections formed on the edges of the cover, an annular tread part of india-rubber and canvas with metal clips embedded therein at regular intervals apart, and formed with a dovetailed groove, an annular flap secured internally to one edge of the cover, a wedge-shaped ridge adapted to fit between the edges of the cover internally made in parts and attached to said flap.

4. The combination with an annular tread part having a dovetailed groove adapted to fit over a tire-cover divided along its outer periphery and formed with dovetail projections on its edges adapted to engage into said groove, of open-framed metal dovetail clips embedded in said tread part at regular distances from each other.

5. In a pneumatic tire, the combination of an air-tube, a cover therefor adapted to open along its outer periphery, metal clips, spaced from one another, and clamping the edges of said cover together, and a tread applied to said clips and cover.

6. The combination of a cover for a pneumatic tire open along its outer circumference and having a lateral annular ridge and an annular recess sunk into the cover at the side of the ridge on each edge of the cover, an annular tread part of rubber and canvas with a groove adapted to fit over said ridges and lateral annular extensions fitting into said recesses, metal open-framed dovetail clips embedded in the rubber of said tread part at regular intervals, an annular flap attached to one edge of said cover internally and a wedge-shaped annular ridge made in parts attached to said flap and adapted to fit between the edges of the cover.

In witness whereof I have hereunto set my hand in the presence of two witnesses.

EDWARD HENRY SEDDON.

Witnesses:
R. J. URQUHART,
C. BOLLÉ.